United States Patent Office 3,449,361
Patented June 10, 1969

3,449,361
PHOSPHINOTHIOYLOXY-1,3-ISOINDOLE DIONES
Johannes Th. Hackmann, Enschede, Netherlands, and Jack Wood, Sittingbourne, Kent, England, assignors to Shell Oil Company, New York, N.Y., a corporation of Delaware
No Drawing. Filed Dec. 4, 1964, Ser. No. 416,102
Claims priority, application Great Britain, Dec. 10, 1963, 48,705/63
Int. Cl. C07f 9/02, 9/16; A01n 9/36
U.S. Cl. 260—326                    2 Claims This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

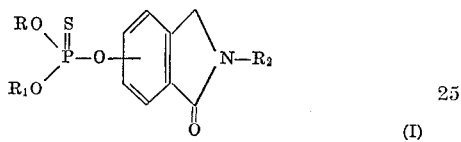

(I)

wherein R and $R_1$ each individually represents straight-chain or branched-chain lower alkyl preferably containing from 1 to 4 carbon atoms, and; $R_2$ represents substituted or unsubstituted phenyl or phenalkyl.

Preferably, R and $R_1$ each contains from 1 to 2 carbon atoms, and $R_2$ contains not more than 12 carbon atoms.

Preferred unsubstituted groups represented by $R_2$ are the phenyl, alkyl-substituted phenyl and phenyl-substituted alkyl groups containing up to 10 carbon atoms, such as phenyl, the isomers of methylphenyl, the isomeric dimethylphenyl, the ethylphenyls, benzyl, and methylbenzyls, phenethyls, alpha-methylbenzyl, and the like.

When the group $R_2$ is substituted the hydrocarbon moiety suitably is one of those described in the immediately preceding paragraph, and the substituent or substituents present may be for example, halogen, haloalkyl, alkoxy, alkylthio, alkylcarbonyl, alkyloxycarbonyl, cyano, or nitro, or groups represented by the formulae —NR°R° or —CONR°R° wherein each R° individually represents hydrogen or alkyl, cycloalkyl, aryl, alkaryl or aralkyl. Hydrocarbon moieties present in the substituent group(s) preferably are ones of those described in the immediately preceding paragraph. Preferred substituents are fluorine, chlorine and bromine, nitro, cyano, alkoxy, alkylthio, alkoxycarbonyl, alkylcarbonyl, alkylamino and dialkylamino containing up to 4 carbon atoms in each of the alkyl radicals, and aralkyloxycarbonyl containing up to 10 carbon atoms.

Most preferable unsubstituted groups represented by $R_2$ are phenyl and benzyl.

Most preferable substituted groups represented by $R_2$ are phenyl and benzyl substituted with one or more of halogen, particularly middle halogen (i.e., bromine and chlorine), and/or alkyl, alkoxy, and alkylthio containing 1–4 carbon atoms, and/or cyano and and/or nitro.

Because of their particular insecticidal properties, compounds of the general class in which R and $R_1$ each contains from 1 to 2 carbon atoms, $R_2$ is one of the most preferable hydrocarbyl or substituted-hydrocarbyl groups mentioned above, and the organo-phosphorus group is attached at the 5-position of the 6-membered ring, are a preferred sub-class.

Specific examples of the novel compounds of the invention are given in the Examples I and II.

The novel compounds of the invention can be prepared by reacting a compound having the formula:

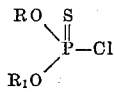

wherein R and $R_1$ have the meanings hereinbefore specified, with a compound having the formula:

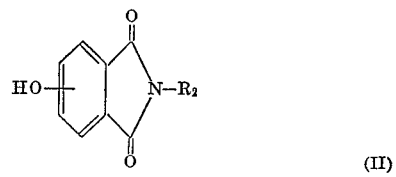

(II)

wherein $R_2$ has the meaning hereinbefore specified, in the presence of a hydrogen chloride acceptor, preferably an alkali or alkaline earth metal carbonate, or a nitrogenous base, for example, pyridine, lutidine, ammonia or triethylamine.

Alternatively, the novel compounds can be prepared by reacting a compound having the formula:

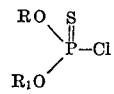

wherein R and $R_1$, have the meanings hereinbefore specified, with a compound having the formula:

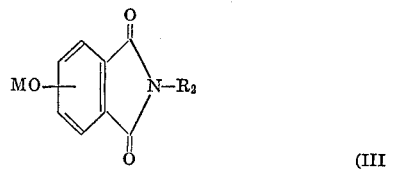

(III)

wherein $R_2$ has the meaning hereinbefore specified and M represents an alkali or alkaline earth metal, or ammonium. The compounds having the Formula III, wherein M represents an alkali metal are preferably prepared by reacting a compound having Formula II with an alkoxide of the alkali metal in an alkanol corresponding with the alkoxide, for instance $CH_3ONa$ in methanol or $C_2H_5ONa$ in ethanol.

The above phosphorylation reactions are preferably carried out in an inert liquid reaction medium which may be a solvent for the reactants or for the desired products or, preferably, for both. Aliphatic ketones such as acetone, methyl ethyl ketone and methyl isobutyl ketone are especially suitable for this purpose. Other suitable inert liquid reaction media are, for example, benzene, diethyl ether, diisopropyl ether, tetrahydrofuran, chloroform, and carbon tetrachloride. The reactants are preferably employed in substantially equimolar amounts. The reactions may be carried out at a temperature between 0 and 150° C. The reaction of compound II with compound (RO) ($R_1O$) P(S) (hal) is preferably carried out at a temperature between 50 and 100° C.

The reaction mixture obtained in the above phosphorylation reactions may be worked up in any conventional way. Thus, where the reaction has been effected in the presence of a water-miscible solvent such as acetone, the reaction mixture may be poured into water and the reaction product extracted with a suitable solvent, for example, ether, chloroform, methylene chloride, or benzene. Alternatively, the reaction mixture may be filtered to remove precipitated halide, the solvent may then be distilled off, and the residual product taken up in a water-immiscible solvent as mentioned above. The solution may then be washed with water, and, if desired, a dilute aqueous solution of an alkali, for example, sodium bicarbonate or sodium hydroxide, dried, and the solvent removed. In many cases the product obtained in this way is sufficiently pure. However, if desired, it may be purified, for instance by recrystallization from a suitable solvent, such as, for example, hexane, petroleum, ether, methanol, isopropanol, or methyl isobutyl ketone, or by means of chromatography, for instance on a silica gel column.

The compounds of the invention are valuable insecticides which are active against a wide range of insect species and related animal organisms belonging to the allied classes of arthropods, such as, for example flies, mosquitoes, caterpillars, weevils, aphids, beetles, mites, and spider mites. However, not all compounds have the same pattern of activity. For example, 5 - dimethoxyphosphinothioyloxy - 2-benzyl-5-dimethoxyphosphinothioyloxy - 2-(3,4-dichlorobenzyl)-1,3-isoindoledione,
5-dimethoxyphosphinothioyloxy-2-(3,4-dichlorobenzyl)-1,3-isoindoledione,
5 - dimethoxyphosphinothioyloxy-2-(2,4-dichlorobenzyl)-1,3-isoindoledione,
5 - dimethoxyphosphinothioyloxy - 2-(2-chlorobenzyl)-1,3-isoindoledione,
5 - dimethoxyphosphinothioyloxy - 2-(4-chlorobenzyl)-1,3-isoindoledione,
5 - dimethoxyphosphinothioyloxy - 2 - (4-nitrobenzyl)-1,3-isoindoledione and
5 - dimethoxyphosphinothioyloxy - 2 - (3 - nitrobenzyl)-1,3-isoindoledione, (that is, compounds of Formula I wherein R and $R_1$= methyl and $R_3$=benzyl, alpha-methylbenzyl or benzyl containing from 1 to 2 of chlorine or nitro), are in particular very active against mosquito larvae and beetles, and extremely active against caterpillars. 5-dimethoxyphosphinothioyloxy-2-phenyl-1,3-isoindoledione, its 3-methylphenyl- and 2- and 4-methylbenzyl analogs, 5-dimethoxyphosphinothioyloxy - 2 - (2-chlorophenyl)-1,3-isoindoledione, its 3- and 4-chloro-, 2- and 4-bromo-, 2,3-dichloro-, 2-methyl-3-chloro-, 2-methyl-5-chloro- and 2-methyl-6-chlorophenyl analogs, thoxphosphinothioyloxy-2-(2-nitrophenyl)-1,3-isoindoledione, (that is, compounds of Formula I wherein R and $R_1$=methyl and $R_3$ is one of the aforementioned phenyl groups) are in particular very active against houseflies, beetles, and caterpillars, the 4-chlorophenyl compound being even extremely active against caterpillars. Most of the compounds specifically mentioned above have a low mammalian toxicity.

It will be appreciated that the compounds of Formula I are with equal accuracy designated as phthalimides. Thus, for example, 5-dimethoxyphosphinothioyloxy-2-benzyl-1,3-isoindoledione can with equal accuracy be designated as 4-dimethoxyphosphinothioyloxy-2-benzylphthalimide, etc.

According to another aspect of the invention, pesticidal compositions comprise a compound of the general formula hereinbefore specified as active ingredient. The compositions may comprise in addition to the pesticide, a surface-active agent, or a carrier, or both a surface-active agent and a carrier.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon, resins such as, for example, polyvinyl chloride and polymers and copolymers of strene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene, and isodurene, coal tar fractions, straight-run petroleumdistillates, thermally or catalytically cracked hydrocarbon oils, platformates, refined gas oil, light lubricating oil fractions, refined kerosine, animal and vegetable oils, and organic solvents such as, for example, methanol, ethanol, isopropanol, n-butanol, amyl alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecules, alkylaryl polyoxyethylene glycol ethers, sorbitan esters of fatty acids containing at least 10 carbon atoms in the molecule, alkylamide sulfonates, and condensation products of ethylene oxide with fatty acid esters, for example the oleic acid ester of anhydrosorbitol. Although both anion- and cation-active surface active agents may be used, the non-ionic surface active agents are preferred.

The compositions of the invention may be concentrates, suitable for storage or transport and containing, for example, form 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing and added emulsifying agent. Aqueous emulsions or dispersions containing an organophosphorus compound as specified above are also within the scope of the invention.

The compositions of the invention may contain in addition to the pesticidal organophosphorus compounds specified above other ingredients, for example, stickers, wetting agents, synergists, stabilizers, or biologically active substances such as other insecticides, fungicides or herbicides. Thus, insecticide such as, for example, 1,1,1-trichloro-2,2-bis(p-chlorophenyl)ethane; endrin; dieldrin; aldrin; O,O-dimethyl-O-(2,2-dichlorovinyl)phosphate; O,O-dimethyl-O - (1,2 - dibromo-2,2-dichloroethyl)phosphate; O,O-dimethyl - O-[1-methyl-2(1-phenylcarbethoxy)-vinyl]phosphate; O,O - dimethyl - O - [2-N,N-dimethylcarbamoyl-1-methylvinyl] phosphate; rotenone and pyrethrum may be incorporated in the compositions of the invention.

The present invention also relates to a method of combating insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

Examples I through II demonstrate preparation of typical species of the compounds of the invention. In those examples, "parts" means parts by weight unless otherwise indicated, with parts by weight bearing the same relationship to parts by volume as does the kilogram to the liter.

The 2-substituted-5-hydroxy-1,3-isoindolediones used as starting materials in the phosphorylation reactions described in Examples I–XI were prepared by mixing ethanolic solutions of approximately equimolar amounts of 4-hydroxyphthalic acid and the appropriate amine $R_3NH_2$ ($R_2$ having the meaning set out above), evaporating the ethanol at reduced pressure, heating the residual mixture at a temperature between 175 and 270° C. for 20 minutes, cooling it, and purifying the product by recrystallization from a suitable solvent, typical preparation being indicated in Table I.

droxy-1,3-isoindole, about 9 parts of redistilled dimethyl phosphorochloridothionate and about 5 parts of anhydrous potassium carbonate were heated with stirring in about 400 parts by volume of anhydrous freshly distilled methyl isobutyl ketone at 90–95° C. for one to one and two-thirds hours. The cooled reaction mixture was filtered and the solvent distilled off under reduced pressure. The residual oil was taken up in methylene chloride and the solution washed with 250 parts by volume of cold 0.2 N

TABLE I

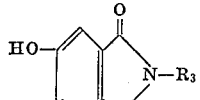

| $R_3=$ | Reaction temperature (° C) | Solvent used in crystallization | Melting point (° C.) |
|---|---|---|---|
| Phenyl | 260 | Ethanol | 250–252 |
| 2-methylphenyl | 260 | Toluene | 229.5–230.5 |
| 3,4-dimethylphenyl | 260 | do | 230–232.5 |
| 2-chlorophenyl | 260 | Ethanol-water | 214–217 |
| 4-chlorophenyl | 200 | Ethanol; toluene | 236–238 |
| 2-bromophenyl | 180–185 | Ethanol-water | 194.5–196 |
| 2,3-dichlorophenyl | 260 | Toluene | 256–258.5 |
| 2-methyl-3-chlorophenyl | 260 | do | 236.5–238 |
| 2-methoxyphenyl | 180–185 | Ethanol | 227–227.5 |
| 2-nitrophenyl | 260 | do | 244–247 |
| 3-nitrophenyl | 200 | Acetone | 280–282 |
| 3-nitro-4-methylphenyl | 260 | Methyl ethyl ketone | 272.5 |
| 2-nitro-4-methylphenyl | 260 | Toluene | 270–273 |
| 2-chloro-4-nitrophenyl | 260 | do | 221–223 |
| 3-acetylphenyl | 260 | Ethanol | 218–220 |
| 4-ethoxycarbonylphenyl | 260 | Toluene | 201–203 |
| 4-methylthiophenyl | 260 | Ethanol | 237–238 |
| 2-methylthiophenyl | 200 | Ethanol-water | 243–245 |
| 3-trifluoromethylphenyl | 260 | Toluene | 215–217 |
| 4-cyanophenyl | 200 | Acetone; methyl ethyl ketone. | 286–288 |
| p-Diphenyl | 260 | Ethanol | 310–310.5 |
| 4-acetamidophenyl | 200 | do | 308–310 |
| Benzyl | 220 | Toluene | 189–192 |
| Alpha-methylbenzyl | 180–185 | do | 177.5–179 |
| 2,4-dimethylbenzyl | 180–185 | do | 174–177.5 |
| 2-chlorobenzyl | 180–185 | do | 172–175.5 |
| 2,4-dichlorobenzyl | 180–185 | do | 181.5–184.5 |
| 3-nitrobenzyl | 180–185 | Methanol | 213–214.5 |
| 4-nitrobenzyl | 180–185 | Isopropanol | 221–224 |

By esterifying 5-hydroxy-2-carboxymethyl-1,3-isoindoledione in the manner described above with 2-phenylethanol, instead of methanol there was obtained 5-hydroxy-2,2-phenylethoxycarbonylmethyl-1,3-isoindoledione, M.P. 60–63° C.

About 10 parts of the appropriate 2-substituted-5-hysodium hydroxide solution, then three times with ice-cold water, and dried over magnesium sulfate, then the solvent was distilled off. In many cases the product obtained was crystallized from a solvent as indicated in Table IV. The structure of all compounds was confirmed by elemental analysis.

TABLE IV

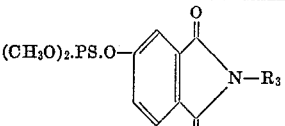

| $R_3=$ | Yield, percent | Melting point (° C) | Solvent used in crystallization |
|---|---|---|---|
| Phenyl (A) | 75 | 111.5–114 | Isopropanol. |
| 2-methylphenyl (B) | 53 | 112–114 | Do. |
| 3-methylphenyl (C) | 53 | 95–96 | Do. |
| 4-methylphenyl (AB) (D) | 55 | 97.5–99 | Do. |
| 3,4-dimethylphenyl (E) | 48 | 99.5–100.5 | Do. |
| 2-chlorophenyl (F) | 50.5 | 88–90 | Do. |
| 3-chlorophenyl (G) | 65 | 100–102 | Do. |
| 4-chlorophenyl (H) | 57.5 | 104–107 | Do. |
| 2-bromophenyl (I) | 47 | 88–90 | Do. |
| 4-bromophenyl (J) | 31 | 108–111 | Do. |
| 2,3-dichlorophenyl (K) | 9 | 81–84 | Do. |
| 2-methyl-3-chlorophenyl (L) | 25 | 107–109 | Do. |
| 4-methyl-3-chlorophenyl | 49 | 121–122.5 | Do. |
| 2-methyl-5-chlorophenyl (M) | 46 | 119–121.5 | Do. |
| 2-methyl-6-chlorophenyl (N) | 30 | 102–104 | Do. |
| 2-methoxyphenyl (O) | 59 | 171–173.5 | Do. |
| 3-methoxyphenyl (P) | 55 | 87–89 | Do. |
| 4-methoxyphenyl (Q) | 48 | 117.5–120 | Methoanol. |
| 2-nitrophenyl (R) | 40 | 117–119 | Isopropanol. |
| 3-nitrophenyl (S) | 41 | 156–158 | Do. |
| 4-nitrophenyl (T) | 31 | 142–145 | Do. |
| 3-nitro-4-methylphenyl | 45 | 151–153.5 | Do. |
| 2-nitro-4-methylphenyl (U) | 40 | 87–88 | Do. |
| 5-nitro-2-methylphenyl (V) | 44 | 162–166 | Do. |
| 4-nitro-2-methylphenyl (W) | 43 | 136–138 | Do. |
| 2-chloro-4-nitrophenyl (X) | 40 | 112–116 | Do. |
| 3-acetylphenyl | 40 | 102.5–104 | Do. |
| 4-ethoxycarbonylphenyl (Y) | 43 | 120–123 | Do. |
| 4-methylthiophenyl (Z) | 37 | 103.5–105 | Do. |
| 2-methylthiophenyl (AA) | 57.5 | 139–142 | Do. |
| 3-trifluoromethylphenyl (AB) | 53 | 136–137.5 | Do. |
| 4-cyanophenyl (AC) | 53 | 127–129 | Do. |

TABLE IV—Continued $(CH_3O)_2.PS.O$—[phthalimide structure]—$N-R_3$

| $R_3$= | Yield, percent | Melting point (° C) | Solvent used in crystallization |
|---|---|---|---|
| p-Diphenyl (AD) | 46 | 197–199 | Methylisobutyl ketone. |
| 4-acetamidophenyl | 32 | 149–153 | Isopropanol. |
| Benzyl (AE) | 73.5 | Oil | |
| Alpha-methylbenzyl (AF) | 57 | Oil | |
| 2,4-dimethylbenzyl (AG) | 59 | 97.5–99 | Methanol. |
| 3,4-dimethylbenzyl (AH) | 42 | Oil | |
| 2-chlorobenzyl (AI) | 41 | 113.5–115 | Do. |
| 4-chlorobenzyl (AJ) | 30 | Oil | |
| 2,4-dichlorobenzyl (AK) | 46 | 102–106 | Do. |
| 3,4-dichlorobenzyl (AL) | 29 | 79–81 | Do. |
| 3-nitrobenzyl (AM) | 18 | 72–77 | Hexane. |
| 4-nitrobenzyl (AN) | 29 | 72–74 | Methano; hexane. |

EXAMPLE II

Preparation of 5-diethoxyphosphinothioyloxy-2-phenyl-1,3-isoindoledione (AO)

This compound was prepared by employing the same method as that described in Example V, but using diethyl phosphorochloridothionate instead of dimethyl phosphorochloridothionate. Yield 66.5%, melting point 93–94.5° C. after recrystallization from ethanol.

*Analysis:* Found: C, 55.3; H, 4.8; N, 3.8; P, 8.0%. Calculated for $C_{18}H_{18}O_5SNP$: C, 55.2; H, 4.6; N, 3.6; P, 7.9%.

EXAMPLE III

The insecticidal activity of the compounds obtained in the previous examples was tested as follows:

(1) A 0.1% by weight solution in acetone of the compound to be tested was prepared, and taken up in a micrometer syringe. Two to three-day-old adult female house flies (*Musca domestica*) were anaesthetized with carbon dioxide, and a 1 microliter of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(2) A quantity of 0.1 mm. of a 0.1% by weight solution of the compound to be tested in acetone was mixed in a beaker with 100 ml. of water. Twenty 5–6 day-old (4th instar) mosquito larvae (*Aedes Aegypti*) were added and the beakers stored for 24 hours. The percentage of dead and moribund larvae was then recorded.

(3) The compounds were formulated as solutions or suspensions in water containing 20% by weight of acetone and 0.05% by weight of Triton X 100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 40 gallons per acre, the plants passing under the spray on a moving belt. The 4th instar (8-day-old) diamond-back moth larvae (*Plutella maculipennis*), ten apterous (6-day-old) pea aphids (*Acrythosiphon pisum*), and ten adult 1–2 week-old mustard beetles (*Phaedon cochleariae*) respectively were placed on the sprayed leaves and each plant then enclosed in a glass cylinder fitted at one end with a muslin cap. Mortality counts were made after 24 hours.

(4) In tests against glass house red spider mites (*Tetranychus telarius*), leaf discs cut from French beans were sprayed in the manner described under III. 1 hour after spraying, the discs were inoculated with 10 adult mites. Mortality counts were made 24 hours after inoculation.

(5) In tests against the cotton stainer (*Dystercus fasciatus*), ten 5th instar nymphs (2–3 week-old) were sprayed directly with formulations of the test compound in water containing 10% by weight of acetone and 0.05% by weight of Triton X 100 as wetting agent. The formulations contained 0.2% by weight of the test compound. After spraying, the nymphs were transferred to bottles supplied with dampened cotton seed for food and closed with a muslin cap. Mortality counts were made after 24 hours.

Compounds of the invention giving 100% control of the housefly were: A, B, C, F, G, J, K, L, M, N, S, Y, Z, AC, AD, AE, AF, AG, AI, AJ, AK, AL, AM, AN, AO.

Compounds giving 100% control of the mosquito larvae were: C, D, E, F, G, H, I, J, K, L N, O, P, Q, R, S, T, U, X, Y, Z, AA, AC, AE, AF, AG, AH, AI, AJ, AK, AL, AM, AN, AO.

Compounds giving 100% control of the mustard beetles were: A, B, C, D, F, G, H, I, J, K, L, M, N, R, S, T, U, V, W, Z, AC, AE, AF, AI, AJ, AK, AL, AM, AN, AO.

Compounds giving 100% control of the diamond-back moth larvae were: A, B, C, D, E, F, G, H, I, J, L, M, N, P, R S, T, U, V, W, X, Y, Z, AA, AC, AE, AF, AG, AH, AI, AJ, AK, AL, AM, AN, AO.

Compound giving 100% control of the pea aphids was: AB.

We claim as our invention:
1. 5-(dimethoxyphosphinothioyloxy)-2-benzyl-1,3 - isoindoledione.
2. 5 - (dimethoxyphosphinothioyloxy) - 2 - phenylisoindoledione.

References Cited

UNITED STATES PATENTS 3,277,113  10/1966  Mannes et al. _____ 260—326

ALEX MAZEL, *Primary Examiner.*

J. A. NARCAVAGE, *Assistant Examiner.*

U.S. Cl. X.R.

424—200